United States Patent [19]
Kohut et al.

[11] Patent Number: 5,453,802
[45] Date of Patent: Sep. 26, 1995

[54] METHOD AND APPARATUS FOR PHOTOGRAPHICALLY RECORDING DIGITAL AUDIO AND A MEDIUM HAVING PHOTOGRAPHICALLY RECORDED DIGITAL SOUNTRACKS

[75] Inventors: Michael Kohut, Ojai; Dana Wood, Los Angeles; Paul Wood, Glendale; Jeff Taylor, Chatsworth; Leroy Reese, Burbank; Aram Tanielian, Rancho Palos Verdes; Jaye M. Waas, Manhattan Beach; Mark Waring, Torrance; George Carlsen, Cardiff, all of Calif.

[73] Assignee: Sony Electronics Inc., Park Ridge, N.J.

[21] Appl. No.: 896,412

[22] Filed: Jun. 10, 1992

[51] Int. Cl.$^6$ .................................................. G03B 31/02
[52] U.S. Cl. ................................................. 352/27; 352/37
[58] Field of Search ................................. 352/11, 27, 29, 352/30, 37, 239, 236; 369/117, 118, 121, 125

[56] References Cited

U.S. PATENT DOCUMENTS

| | | | |
|---|---|---|---|
| 1,855,827 | 4/1932 | Flint et al. | 355/90 |
| 3,932,032 | 1/1976 | Weinstein | 352/11 |
| 4,256,389 | 3/1981 | Engebretson | 352/11 |
| 4,306,781 | 12/1981 | Mosely | 352/37 |
| 4,356,945 | 11/1982 | Carter | 226/6 |
| 4,461,552 | 7/1984 | Levine | 352/27 |
| 4,491,399 | 1/1985 | Bell | 352/92 |
| 4,553,833 | 11/1985 | Kanaoka et al. | 355/40 |
| 4,600,280 | 7/1986 | Clark | 352/37 |
| 4,622,598 | 11/1986 | Doi et al. | 360/22 |
| 4,659,198 | 4/1987 | Beauviala et al. | 352/92 |
| 4,870,633 | 9/1989 | Matsushita et al. | 369/47 |
| 4,893,921 | 1/1990 | Beauviala | 352/92 |
| 5,155,510 | 10/1992 | Beard | 352/27 |
| 5,194,996 | 3/1993 | Shores | 360/48 |

FOREIGN PATENT DOCUMENTS

| | | | |
|---|---|---|---|
| 0040188 | 12/1981 | European Pat. Off. . | |
| WO91/05335 | 4/1991 | WIPO | G11B/7/00 |
| WO91/16709 | 10/1991 | WIPO | G11B/20/12 |
| WO92/14239 | 8/1992 | WIPO | G11B/7/00 |

OTHER PUBLICATIONS

Enz, "Cinema Digital Sound," FKT Fernseh–und Kino–Technik 45, No. Jan. 1991, Heidelberg, DE.

Primary Examiner—Michael L. Gellner
Assistant Examiner—Eddie C. Lee
Attorney, Agent, or Firm—Limbach & Limbach

[57] ABSTRACT

A method and apparatus for photographically recording digital audio signals, and a medium having digital audio signals photographically recorded thereon. In a preferred embodiment, a motion picture film recorded in accordance with the invention has multiple digital audio soundtracks and an analog audio soundtrack photographically recorded thereon. Two or more channels of digital audio information can be recorded in each digital soundtrack, along with additional digital information for clocking, tracking, and error detection and correction. Each digital soundtrack is recorded in an array of bit areas arranged in row and column order. In a class of preferred embodiments, each row of digital audio bits is recorded simultaneously by exposing the film to radiation that has been modulated by a linear shutter array. The radiation transmitted by each shutter array is projected onto a row of spots. Each spot covers the full width of one of the bit areas in a row, but only part of the length of the bit area. As the medium is translated continuously (lengthwise) relative to the projected spots, each of the spots sweeps across a bit area, thereby recording a bit in the bit area which it sweeps in a manner analogous to painting the bit area with a paint brush.

2 Claims, 6 Drawing Sheets

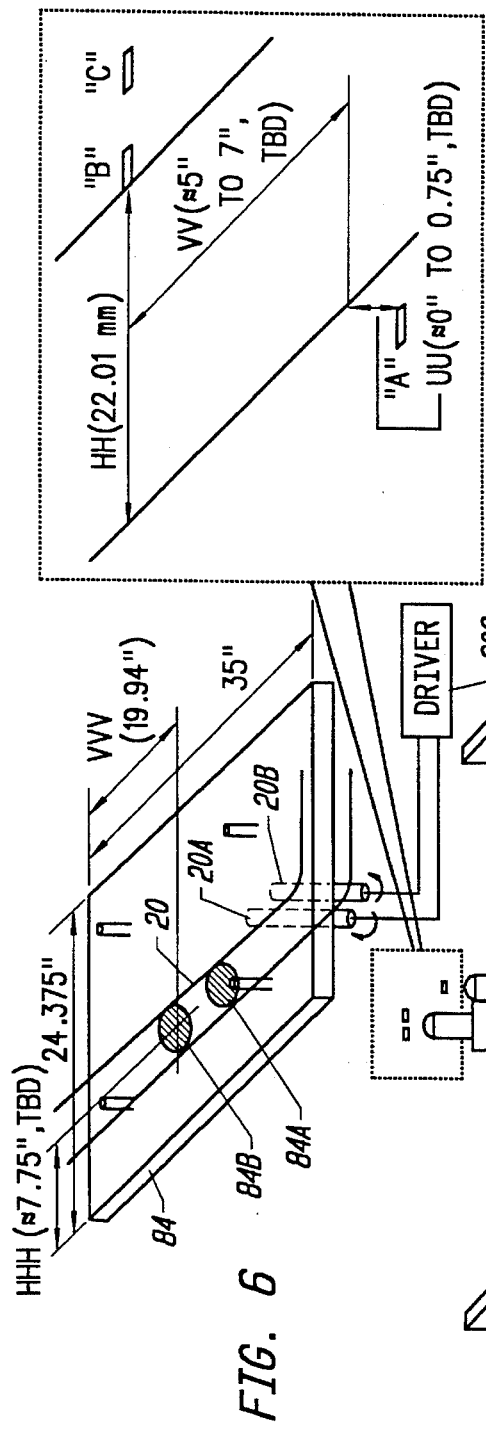
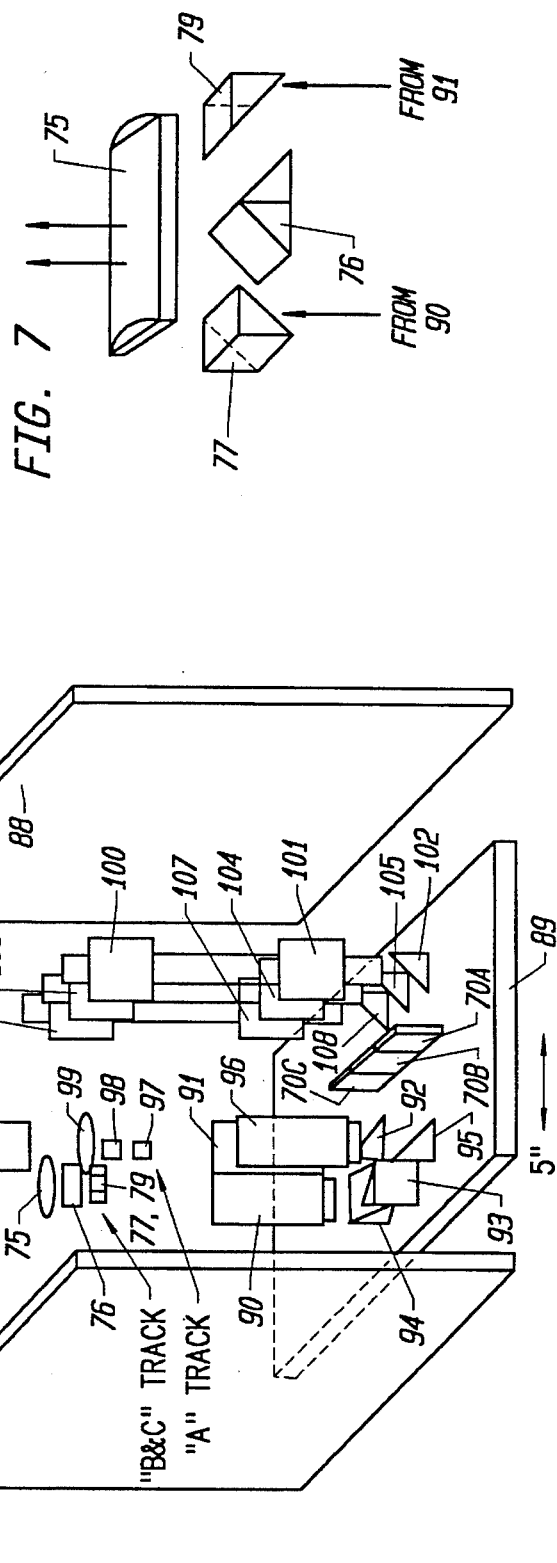

METHOD AND APPARATUS FOR PHOTOGRAPHICALLY RECORDING DIGITAL AUDIO AND A MEDIUM HAVING PHOTOGRAPHICALLY RECORDED DIGITAL SOUNTRACKS

FIELD OF THE INVENTION

The invention relates to methods and apparatus for photographically recording digital audio signals, and to media having digital audio signals photographically recorded thereon. The invention can be applied to record digital audio signals photographically on motion picture film.

BACKGROUND OF THE INVENTION

The photographic recording of digital soundtracks on motion picture film has been proposed. For example, U.S. Pat. No. 4,600,280, issued Jul. 15, 1986, describes a technique for recording a digital soundtrack on a film strip by exposing the film to modulated light from a light source. In one method disclosed in U.S. Pat. No. 4,600,280, an intermittent light beam (encoded with digital audio information) is scanned horizontally across the film, and the film is then advanced vertically and the scanning process repeated. U.S. Pat. No. 4,600,280 suggests alternatively that the light can be projected on the film through a linear array of solid state shutters or Bragg cell modulators.

U.S. Pat. No. 4,461,552, issued Jul. 24, 1984, also discloses a method in which digital audio is photographically recorded on motion picture film.

It has also been proposed to photographically record other types of digital information on photographic film. For example, U.S. Pat. No. 4,553,833, issued Nov. 19, 1985, discloses a method for photographic recording of characters and symbols on photographic film. In this method, light emitted from a relatively large-sized array (such as a light emitting diode array) is focused through converging lenses, to cause a relatively small-sized dot pattern to be projected on the film.

U.S. Pat. No. 4,306,781, issued Dec. 22, 1981, suggests recording a command data track (track 11 shown in FIG. 2) on motion picture film, along with an unmodulated locator track (track 5 shown in FIG. 2) and several analog soundtracks. Similarly, both U.S. Pat. No. 4,659,198, issued Apr. 21, 1987, and U.S. Pat. No. 4,893,921, issued Jan. 16, 1990, disclose a process for recording digital data along an edge portion of a strip of cinematographic film.

However, until the present invention, it had not been known how to record multiple channels of digital audio information on a continuously translating motion picture film with very high resolution. Nor had it been known how to record such digital audio information along with additional digital information for clocking, tracking, and error detection and correction, in a manner permitting the recording of an additional conventional audio soundtrack on the same motion picture film.

SUMMARY OF THE INVENTION

The invention is a method and apparatus for photographically recording digital audio signals, and a medium (such as motion picture film) having digital audio signals photographically recorded thereon. In a preferred embodiment, a motion picture film recorded in accordance with the invention has multiple digital audio soundtracks and an analog audio soundtrack photographically recorded thereon. Two or more channels of digital audio information are preferably recorded in each digital soundtrack, along with additional digital information for clocking, tracking, and error detection and correction.

Each digital soundtrack is recorded in an array of bit areas. The bit areas are arranged in row and column order, and one digital audio bit is recorded in each bit area. In a preferred embodiment in which the digital soundtracks are recorded on motion picture film, each column is oriented substantially parallel to the longitudinal axis of the film, and each row is oriented substantially perpendicular to the longitudinal axis. Each row of digital audio bits is recorded simultaneously by exposing the film to light that has been modulated by a linear shutter array (preferably comprising magneto-optic cells).

In a class of preferred embodiments, the digital audio information is recorded on a photosensitive medium by projecting a modulated laser beam (having a wavelength of 543.5 nm in one preferred embodiment) on a row of each of three digital soundtrack areas. Use of laser radiation has substantial optical benefits over use of incandescent lamp radiation, including longer source lifetime, and greater uniformity, stability, and reliability. If a single laser beam is employed to illuminate two or more spatially separated digital soundtrack areas, optical elements are employed to split the beam and direct each beam portion on a row of a different one of the digital soundtrack areas. Preferably, each beam portion is modulated by passing it through a linear array of shutters. Each shutter in the array can be a magneto-optic cell, and each shutter is independently controllable so as to selectively transmit the beam portion incident thereon.

In a preferred embodiment, the radiation transmitted by each shutter array is projected onto a row of spots. Each spot covers the full width of one of the bit areas in a row, but only part of the length of the bit area. For example, the radiation projected from the shutter array can be directed onto the upper third of each bit area in a row. As the photosensitive medium is translated continuously (lengthwise) relative to the projected spots, each of the spots sweeps across a bit area, thereby recording a bit in the bit area which it sweeps (in a manner analogous to painting the bit area with a paint brush).

BRIEF DESCRIPTION OF THE DRAWINGS

FIG. 6 is an exploded perspective view of an apparatus for recording three digital soundtracks on a motion picture film in accordance with the invention.

FIG. 7 is a perspective view of a preferred embodiment of a portion of the FIG. 6 apparatus.

DETAILED DESCRIPTION OF THE PREFERRED EMBODIMENTS

Figure 1:
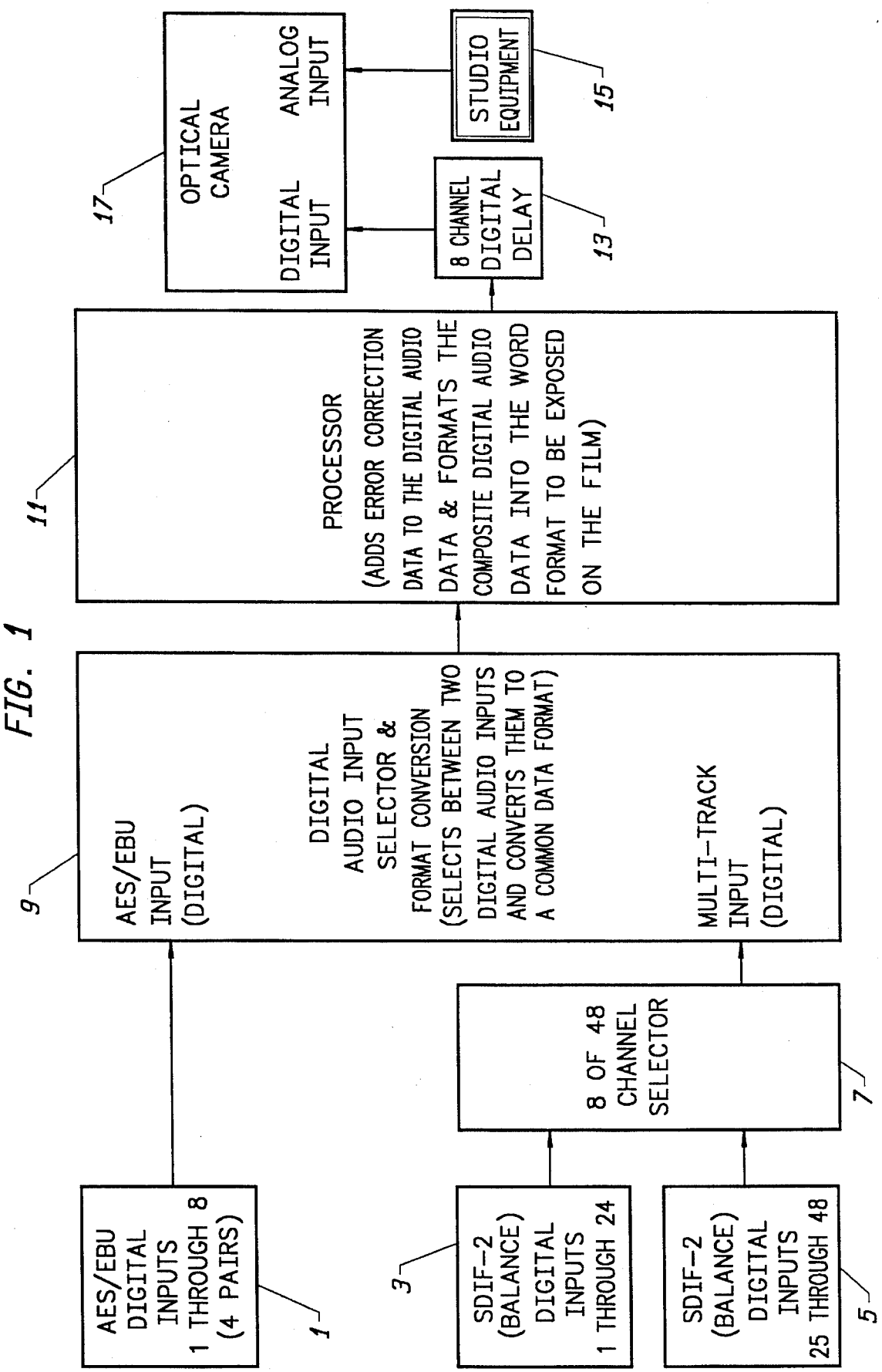
FIG. 1 is a block diagram of a preferred embodiment of the inventive system for photographically recording digital audio signals.

A preferred embodiment of the inventive system for photographically recording digital audio signals will be described with reference to FIG. 1. Optical camera 17 accepts a digital audio signal comprising eight digital audio channels from digital delay circuitry 13, and an analog audio signal from conventional audio signal generation system 15. Camera 17 (to be described in detail below with reference to FIGS. 6, 7, and 8) records the digital and analog audio information on a photographic medium, such as black and white motion picture film.

The system can accept a variety of raw digital audio inputs, such as eight channels of digital audio having AES/EBU format (from circuit 1), and twenty-four channels of digital audio having SDIF-2 format (from each of identical circuits 3 and 5). Channel selector 7 selects eight SDIF-2 channels from the forty-eight channels supplied to it from circuits 3 and 5, and supplies the eight selected SDIF-2 channels (in parallel) to a multi-track input of digital audio input selector and format conversion circuit 9. Circuit 9 also accepts eight AES/EBU digital audio channels from circuit 1.

Circuit 9 selects either the SDIF-2 audio channels or the AES/EBU audio channels, and puts the selected channels into a desired common digital data format. The eight reformatted digital audio channels asserted at the output of circuit 9 undergo further processing in signal processor 11.

Processor 11 generates composite data by adding error correction data to the digital audio from circuit 9, formats the composite data into the word format to be projected onto photographic film within camera 17, and supplies eight channels of the reformatted composite data to digital delay circuit 13.

In a preferred embodiment, each of the eight channels of digital audio asserted at the output of processor 11 is a 16-bit, pulse code modulated digital signal (having a bit rate of 48 KHz).

Figure 2:
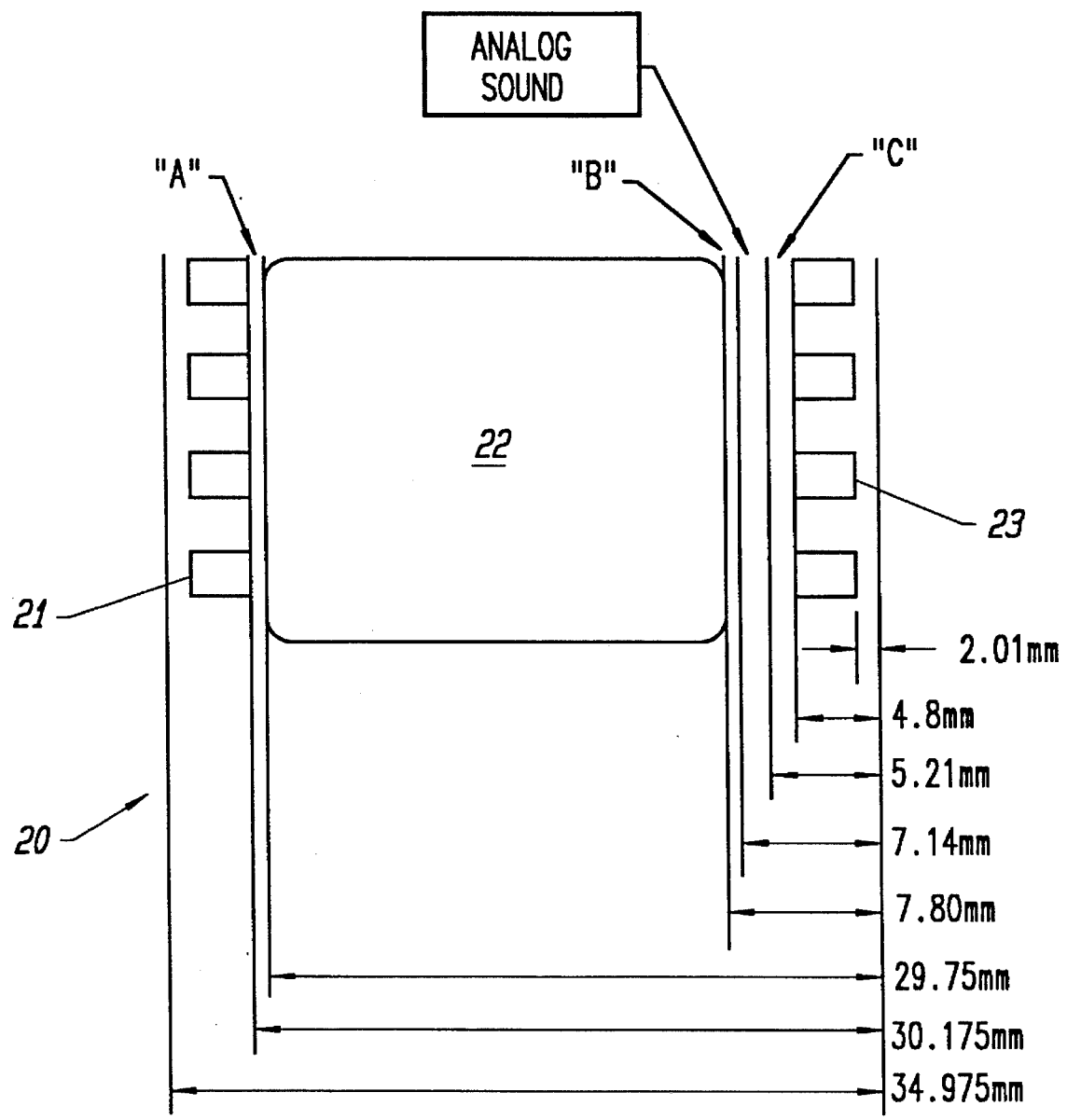
FIG. 2 is an elevational view of a section of motion picture film, on which three digital soundtracks and one analog soundtrack have been recorded.

In a preferred embodiment, camera 17 records multiple digital soundtracks (in three separate digital soundtrack areas), and an analog soundtrack, on motion picture film 20 (shown in FIG. 2). Film 20 has sprocket holes 21 along its left edge, sprocket holes 23 along its right edge, and a picture area for recording image (picture) frames 22 between rows of sprocket holes 21 and 23. Preferably, the analog soundtrack is recorded in a conventional manner between the picture area and the row of sprocket holes 23.

Either a single soundtrack or two or more soundtracks can be recorded in each of the digital soundtrack areas. However, for the sake of convenience we will sometimes refer to each digital soundtrack area as a "digital soundtrack."

Unexposed film 20 is preferably conventional black and white motion picture film, preferably of the type known as "35 mm" motion picture film which has standard dimensions including the following (as indicated in FIG. 2): an overall film width of 34.975 mm, a distance of 2.01 mm between the outer edge of each sprocket hole and the film edge nearest thereto, and a distance of 4.80 mm between the inner edge of each sprocket hole and the film edge nearest thereto. These standard film dimensions are set forth in the "American Standards and Recommended Practices of the Society of Motion Picture and Television Engineers" for 35 mm motion picture film.

In accordance with a preferred embodiment of the invention, one of the digital soundtrack areas (soundtrack "A" in FIG. 2) is positioned between the picture area (the central strip of the film including frames 22) and row of sprocket holes 21. The other two digital soundtrack areas (soundtracks "B" and "C" in FIG. 2) are preferably positioned between the picture area and row of sprocket holes 23, with the analog soundtrack between the two digital soundtracks "B" and "C."

When unexposed film 20 has the above-mentioned SMPTE standard 35 mm film format, track "A" should be positioned in the strip (having width 0.475 mm) between the picture area and the inner edges of holes 21, and tracks "B" and "B" should be positioned between the picture area and the inner edges of holes 21 (with track "B" positioned within the strip extending between 7.14 mm and 7.80 mm from the right edge of the film, and track "B" positioned within the strip extending between 4.80 mm and 5.21 mm from the right edge of the film). In this embodiment, the analog soundtrack is positioned within the strip extending between 5.21 mm and 7.14 mm from the right edge of the film.

Of the three available digital soundtracks ("A," "B" and "C") in the FIG. 2 embodiment, track "B" has the benefit of being farthest removed from the edge of the film. Because it is the farthest removed from the high wear areas immediately adjacent to the sprocket holes, track "B" is the least susceptible to mechanical damage.

Figure 3:
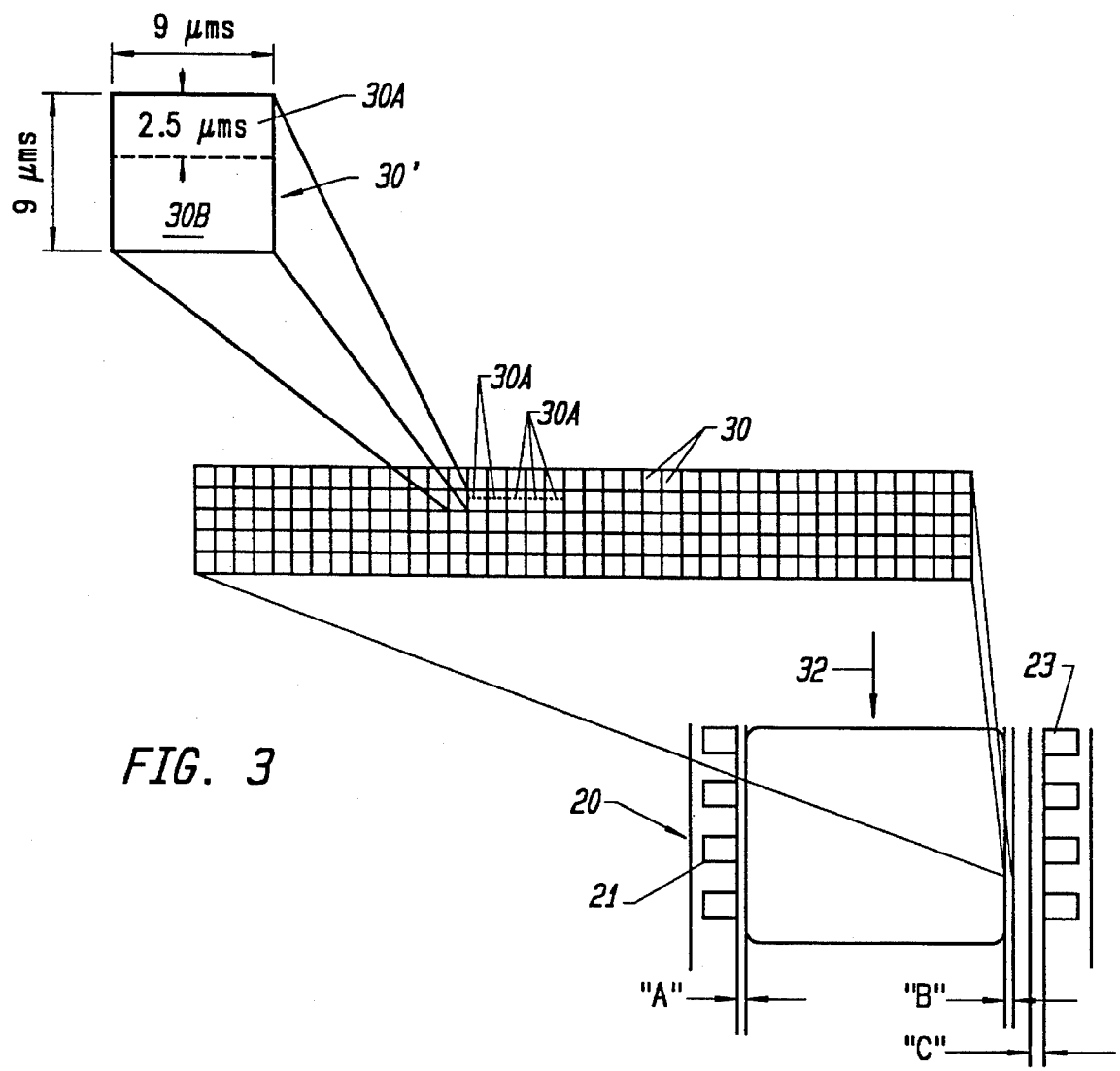
FIG. 3 is a diagram illustrating the size and shape of the bit regions comprising each of the digital soundtracks of FIG. 2.

Each of the three digital soundtrack areas is an array of bit areas arranged in row and column order. The portion of area "B" shown in enlarged view in FIG. 3 includes five horizontally oriented rows of square-shaped bit areas 30. Each row (of the enlarged portion shown in FIG. 3) comprises forty bit areas 30, so that the portion of area "B" shown in this enlarged view is a grid of five rows and forty columns of bit areas. One digital audio bit is recorded in each bit area 30. In a preferred embodiment, each bit area has a length (in the vertical direction in FIG. 3) of 9 microns, and width (in the horizontal direction in FIG. 3) of 9 microns.

The bit areas could have other sizes and shapes. The minimum practical bit size will depend on the film characteristics (i.e., graininess) as well the size and focal power of the shutter array cells and the modulated beam focusing optical elements. We have found that for typical, commercially available black and white 35 mm motion picture film, it is feasible to employ bit areas having size substantially smaller than 9×9 microns.

It is within the scope of the invention for the digital soundtrack areas to include any number of rows and columns. The rows can be arranged with no space between them (as in FIG. 3), or with unexposed horizontal strips between them.

In one embodiment, film 20 is translated continuously while digital audio bits are recorded in bit areas 30. Many bits are recorded simultaneously in each row of bit areas, since the bit areas in the row simultaneously receive light modulated by a linear shutter array. The array can be oriented horizontally (i.e., substantially parallel to the rows), or the light propagating from the array can be redirected so that it is incident on only a selected row (or rows). In a preferred embodiment, one or more laser beams are encoded with the digital audio by passing through a linear shutter array, and then project on one row of each of the digital soundtracks. For recording bits on typical black and white motion picture film, the laser radiation preferably has a wavelength of 543.5 nm (because this type of film is very sensitive to radiation having this wavelength). However, laser radiation having some other wavelength (i.e., 532 nm radiation from a YAG laser) may be preferred in other applications.

If a single laser beam is employed, optical elements split the beam into portions and direct each beam portion on a row of a different one of the digital soundtracks. Each shutter in the linear array can be a magneto-optic cell, and each shutter is independently controllable so as to selectively transmit the beam portion incident thereon.

In a preferred embodiment, the radiation transmitted by each shutter (i.e., magneto-optic cell) in the shutter array is projected onto a spot which covers the full width, but only a portion of the length, of one of the bit areas. For example, the projected radiation can be incident on the upper third of the bit areas comprising a row. For another example, if the bit areas have 9 micron×9 micron size, the projected radiation incident on each bit area (e.g., bit area 30' shown in FIG. 3) occupies the bit area's uppermost strip having length 2.5 microns (i.e., portion 30a shown in FIG. 3). As the film translates continuously downward (in the direction of arrow 32 in FIG. 3) relative to the projected spots, the radiation projected on each bit area (e.g., area 30') sweeps across the bit area's lower portion (i.e., portion 30b shown in FIG. 3), thereby recording a bit in the entire bit area in a manner analogous to painting the bit area with a paint brush.

More generally, digital audio bits are photographically recorded in bit areas on a photosensitive medium in accordance with the invention, wherein each bit area has a length A along a first axis, and a width B along a second axis perpendicular to the first axis, as the medium is continuously translated parallel to the first axis at a rate R. While the medium is so translated, encoded radiation is projected onto a row of spots coinciding with the medium for a duration T, wherein the row of spots is oriented parallel to the second axis, wherein each of the spots has a width B along the second axis and a length C along the first axis, wherein C is less than A, and wherein the duration, T, and the rate, R, are selected so that their product, RT, is substantially equal to the length A.

In the embodiment described above in which each bit area has size 9×9 microns, if the film is transported continuously at a conventional rate of 24 picture frames per second during recording, digital audio data can be recorded with an absolute bit density of 50,847 bits per second (per column of bits). With a digital audio sample rate of 48,000 samples per second, there is room in the digital soundtrack areas for recording 2847 extra rows of digital data per second. These extra rows can be uniformly divided vertically (i.e., in the direction of film transport) along the digital soundtrack areas, and used to allow a small mechanical tolerance of exact film position for aid in the recording, copying, and readout processes.

The quality and consistency of the exposed bit size, the contrast ratio between exposed and unexposed bits, and the rate at which the digital bits are recorded are critical. Using the recording system to be described below, the shutter array geometry can be scaled and controlled so that the size of the exposed bit areas will vary by less than 0.01%. The inventive recording system is capable of achieving a contrast ratio of greater than 300:1 per imaged bit (with a maximum overall variation of less than 10% between bits).

Figure 5:
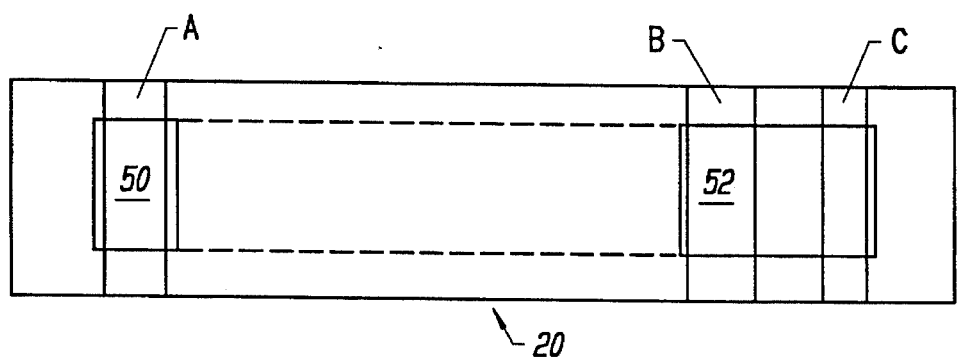
FIG. 5 is a schematic diagram representing two blocks of digital bits on which error detection and correction are performed independently in accordance with the invention.

In one embodiment of the invention, digital soundtrack areas "A," "B," and "B" together have a total of 165 columns of bit areas. Eight, parallel, 16-bit digital soundtracks (i.e., eight audio "channels") are recorded in these areas, with each channel recorded in a different group of sixteen columns. Additional digital bits for clocking, tracking, error detection and correction, or other functions, can be recorded in the remaining thirty-seven columns (in a manner to be explained with reference to FIGS. 4 and 5).

For example, if each bit area has a width of 9 microns, soundtrack area "B" can include 47 columns (so that it has a width of 425 microns), soundtrack area "B" can include 73 columns (so that it has a width of 660 microns), and soundtrack area "B" can include 45 columns (so that it has a width of 410 microns). The eight digital soundtrack channels can be recorded in the three areas as follows:

| 16-Bit Channel | Soundtrack Area | Location Within Area |
| --- | --- | --- |
| Sub Woofer | A | Adjacent to sprockets |
| Right/Center | A | Adjacent to picture area |
| Surround Left | B | Adjacent to picture area |
| Right | B | Between "Surround Left" and "Center" channels |
| Center | B | Between "Right" and "Left" channels |
| Left | B | Adjacent to analog soundtrack |
| Surround Right | C | Adjacent to analog soundtrack |
| Left/Center | C | Adjacent to Sprockets |

In this embodiment, the frequency range of digital data recordable on film is from 2 Hz to 24,000 Hz. Although the range of output frequencies to be supported will depend on the type of reader output system employed, typically an output frequency range of at least 20 Hz to 20,000 Hz will be supported. The dynamic range of the system is 98 dB, with the 16 data bits of each channel providing 16,384 steps.

In the 165 column embodiment, the system of the invention can record eight channels of 16-bit digital audio data as well as additional digital data (on film translating continuously at the standard rate of 24 picture frames per second), thereby recording bits at an overall bit rate of about 6.9 Mbits per second.

Boundaries of at least 0.001 inches should be provided between the edge of each digital soundtrack area and its neighbor (an edge of the analog soundtrack, the picture area, or a sprocket hole). This is to avoid undesirable "buzz" which can occur if the means for reading the analog track encounters the digital audio data, and uneven digital data quality which can result if the digital soundtrack reading means is subject to noise from neighboring areas.

Figure 4:
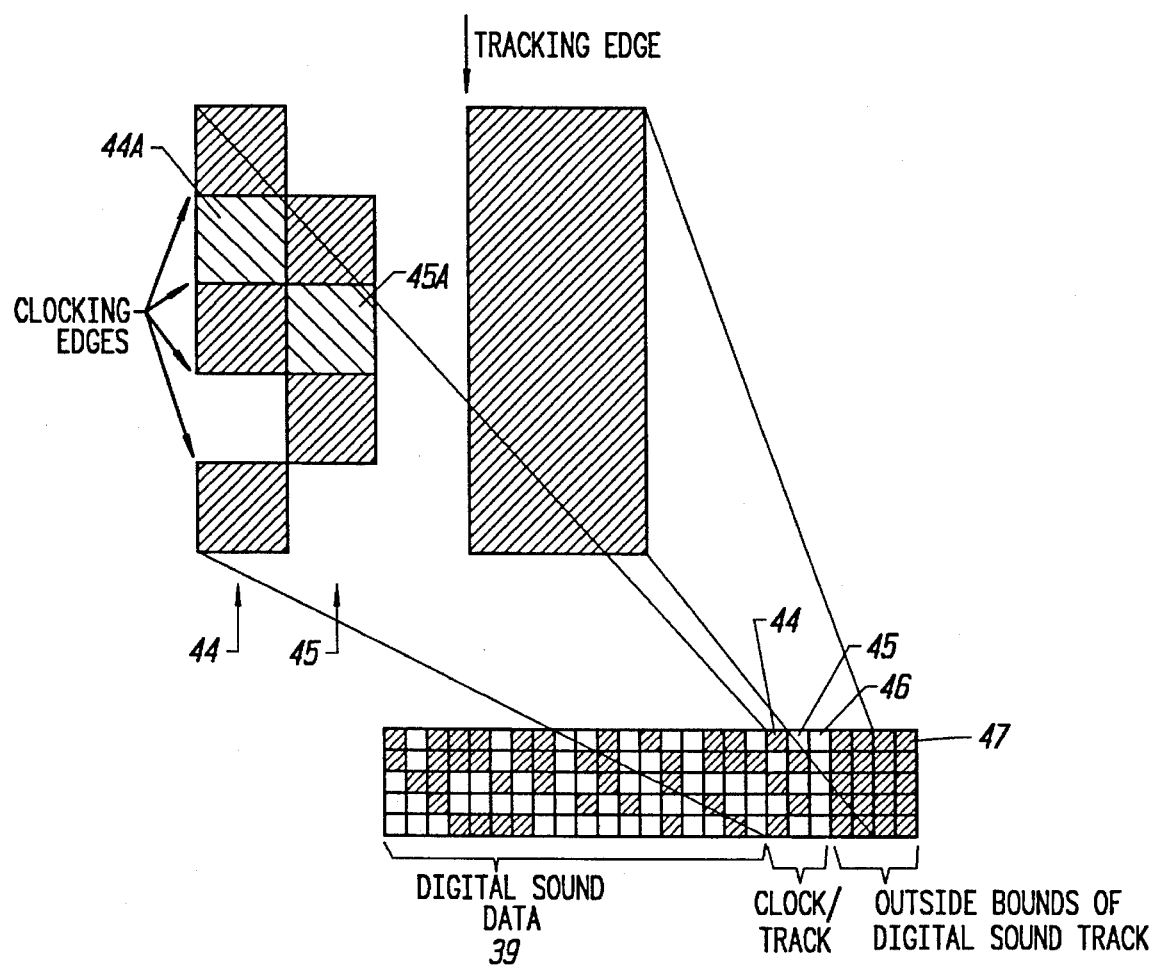
FIG. 4 is a detailed view of a portion of a preferred embodiment of one of the digital soundtracks of FIG. 2.

In a class of embodiments, the invention employs two independent recording mechanisms (and two independent reading mechanisms) to record digital audio data (and to read the recorded digital data): one for the "B" track area; and the other for the "B" and "B" track areas. For this reason, we prefer to allocate specific columns of both the "B" area and the "B" area for the recording of clocking and tracking bits. FIG. 4 shows three such columns of clocking and tracking bits, which are recorded alongside digital audio data 39 (representing audio data within the "B" area or the "B" area).

The clocking bits recorded in columns 44 and 45 (sometimes referred to as the "clocking track"), have a differential, alternating bit pattern (as shown in FIG. 4). This bit pattern provides periodically spaced event transitions, each from a black (unexposed) film area to a white (exposed) film area, which give a physical reference to the location and occurrence time of each row of digital audio data bits.

All the bit areas of the outermost column of soundtrack area "B" or "B" (represented by column 46 in FIG. 4) are exposed to light during the recording process. Thus, this column (sometimes referred to herein as the "guide track") defines a smooth edge of exposed film (referred to herein as the "tracking edge") which contrasts with adjacent region 47 of unexposed film. By processing signals from a pair of fixed detectors which straddle the expected location of the tracking edge (while the film translates past the detectors), together with clocking signals representing detected clocking track edges, the expected total tracking error in reading the recorded digital audio bits should be no more than about 1 micron. If tracking is lost, for example upon encountering a film splice, it is expected that recovery of tracking can be accomplished within five clock cycles.

An important aspect of the invention is the recording of error detection and correction code with the digital audio bits, so that error detection and correction can be readily performed as part of the operation of reading the recorded bits. Error detection and correction is desirable to compensate for original defects in new "theater ready" prints, film wear, contamination by dust or the like, and film splicing.

In one class of embodiments, error detection and correction code (such as Reed-Solomon error code) is recorded photographically on the film with one or more blocks of the digital audio data. Examples of such blocks of data include the first data block recorded in subset 50 (shown in FIG. 5) of soundtrack area "A," and the second data block recorded in subset 52 (shown in FIG. 5) of soundtrack areas "B" and "C." A first set of Reed-Solomon error detection and correction code ("error code") is recorded with the first block of data within subset 50, and a second set of Reed-Solomon error code is recorded with the second block of data within subset 52 (however, neither digital audio data nor error code is recorded within the analog soundtrack area between areas "B" and "C"). At the time the recorded first and second blocks of data are read, the first set of error code is processed to identify errors occurring in the first block (and optionally to determine an error rate for the first block), and the second set of error code is processed to identify errors occurring in the second block (and optionally to determine an error rate for the second block).

In a variation on this technique, each of the first and second blocks can be defined so as to have approximately the same number of bits. For example, the first block can include four digital audio channels recorded in area "B" and part of area "B" and the second block can include four digital audio channels recorded in the other part of area "B" and in the adjacent portion of area "C."

In the embodiments of the two previous paragraphs, two separate sets of error code are recorded in one vertical strip of film 20. However, more than or less than two sets of error code could be recorded in such vertical strip. For example, it may be desired to record a single error code set entirely in the "B" soundtrack area (and not in the "B" or "B" areas), because the "B" area has greater insulation from sprocket hole wear than do areas "A" and "C."

The digital audio bits and the error code bits can be grouped into "odd" blocks and "even" blocks (in processing means 11 of FIG. 1), and the odd and even blocks can then be recorded in an interleaved manner. To enable the recorded interleaved bits to be reordered upon playback to facilitate error detection and error correction, special marker bits can be photographically recorded in the clock tracks (i.e., clock tracks 44 and 45 in FIG. 4) to mark the top and/or bottom rows of each of the odd and even blocks. For example, one set of marker bits can be periodically recorded in one clock track to mark the first row of each odd block (for example, one such marker bit can be recorded in bit area 44a of track 44 of FIG. 4), and another set of marker bits can be periodically recorded in another clock track to mark the first row of each even block (for example, one such marker bit can be recorded in bit area 45a of track 45 of FIG. 4).

We contemplate that, following error detection, digital correction of up to 30% of the relevant bits may be required for the most important digital audio channels. The digital audio channels which have the lowest information content (such as low frequency "Boom" channels) will likely require significantly less error correction. We expect that conventional error correction means can be employed to accomplish the necessary error correction, if appropriate error code is recorded with the digital audio bits.

Figure 8:
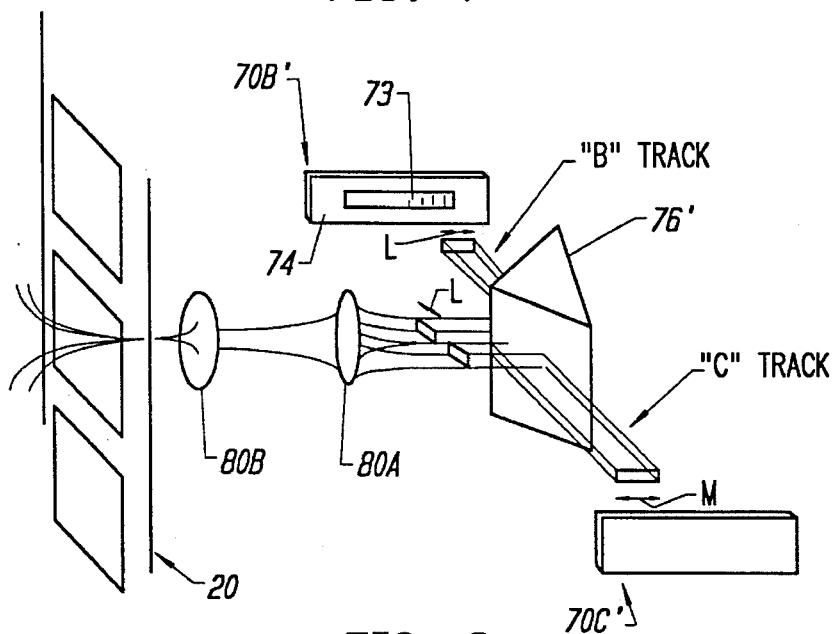
FIG. 8 is a perspective view of an alternative preferred embodiment of a portion of the FIG. 6 apparatus.

With reference to FIGS. 6–8, we will next describe two preferred embodiments of an apparatus for photographically recording digital audio bits (and other digital data) on a photosensitive medium such as unexposed motion picture film.

In the FIG. 6 apparatus, lasers 100, 103, and 106 are fixedly mounted in the volume enclosed by housing members 86, 88, and 89. Each of lasers 100, 103, and 106 emits a beam of coherent radiation, which is preferably green radiation having wavelength 543.5 nm. The beam from laser 100 is polarized by polarizing element 101 (which is preferably a linear polarizer), and is directed by reflective element 102 to linear shutter array 70a. Array 70a comprises a number, X, of separately controllable shutters arranged in a row. The polarized radiation from laser 100 is selectively transmitted by each cell of array 70a.

Similarly, the beams from lasers 103 and 106 are polarized, respectively, by polarizing elements 104 and 107 (which are preferably linear polarizers), and are directed by reflective elements 105 and 108, respectively, to linear shutter arrays 70b and 70c. Array 70b comprises Y separately controllable shutters arranged in a row. Array 70c comprises Z separately controllable shutters arranged in a row. The polarized radiation from lasers 103 and 106 is selectively transmitted by each cell of array 70b and 70c, respectively.

In a preferred embodiment, arrays 70a, 70b, and 70c, modulate light for digital soundtrack areas "A," "B," and "C," respectively, and have X=47, Y=73, and Z=45 shutters, respectively. Thus, modulated light that has transmitted through shutter array 70a defines 47 bits to be recorded as one row of soundtrack area "A." Similarly, modulated light that has transmitted through shutter array 70b defines 73 bits to be recorded as one row of soundtrack area "B," and modulated light that has transmitted through shutter array 70c defines 45 bits to be recorded as one row of soundtrack area "C."

In a preferred embodiment, each shutter of each of arrays 70a, 70b, and 70c is a magneto-optic cell. The state of each such magneto-optic cell is controlled by control circuitry (not shown in FIG. 6) in response to the output of circuit 13 of FIG. 1. Examples of magneto-optic cells suitable for use in the linear shutter arrays include the cells described in U.S. Pat. No. 4,478,872, issued Oct. 23, 1984; U.S. Pat. No. 4,497,545, issued Feb. 5, 1985; U.S. Pat. No. 4,500,176, issued Feb. 19, 1985; U.S. Pat. No. 4,500,177, issued Feb. 19, 1985; or U.S. Pat. No. 4,563,236, issued Jan. 7, 1986.

The polarized beams incident on arrays 70a, 70b, and 70c are shaped (by means within elements 101, 104, and 107) so that they have elliptical Gaussian profiles. The Gaussian elliptical waist of each beam is truncated horizontally (i.e., parallel to the axis of the shutter array in its path), by an apertured mask placed at or in front of the shutter array plane, so that the incident intensity variation at any point of the shutter array is less than 10%. The aperture of each apertured mask is dimensioned to cause radiation to be projected from the masked shutter array onto spots coinciding with the film each having a size smaller than the bit area size on the film (i.e., the cause radiation to be projected onto a bit area portion such as portion 30a of bit area 30' of FIG. 3).

The modulated laser radiation which propagates away from array 70a is directed by reflective element 95 through lens 96. The focused radiation emerging from lens 96 is directed by reflective elements 97 and 98 to lens 99, and through lens 99 to lens system 82. Lens system 82 spherically magnifies down in size the radiation focused thereon by lens 99, by a factor of 8.44. Lens system 82 (and lens system 80 to be discussed below) protrudes upward through aperture 84a in flat table top 84. A length of motion picture film 20 is mounted a distance (in the range from 3.75 inches to 4.5 inches) above the upper end of lens system 82.

Table top 84 preferably has length 35 inches (in the "vertical" direction, indicated by arrow VVV, parallel to the axis of soundtrack area "A"), and width 24.375 inches (in the "horizontal" direction, indicated by arrow HHH, between soundtrack areas "B" and "C."

The radiation emerging from lens system 82 is projected upward onto a row of soundtrack area "B" of motion picture film 20. Specifically, lens system 82 focuses the radiation to produce a real image waist on area "B" which measures 2.5 microns in the vertical direction and has a center-to-center bit spacing of 9 microns in the horizontal direction. Thus, an image of a sequence of spots, each having vertical size equal to 2.5 microns and horizontal size equal to an integral multiple of 9 microns, is projected on spots coinciding with a row of area "A."

Film drive means 20c causes sprocket members 20a and 20b (shown schematically in FIG. 6) to rotate continuously for any selected duration of time. The rotating sprocket members, in turn, continuously transport film 20 in the vertical direction relative to the row of spots (coinciding with film 20) on which radiation is projected. In the case that sprocket members 20a and 20b translate film 20 at a rate R for a duration T, the radiation projected on each row of spots will expose a row of bit areas on film 20 in paintbrush fashion, with each bit area in the row having (vertical) length RT. Preferably, the length RT is equal to 9 microns, in the case that the horizontal center-to-center bit spacing is 9 microns.

Lens system 80 projects radiation onto two spot sequences (which, in general, differ from the spot sequence onto which radiation is projected from lens system 82 described above only in that they have a different horizontal size) on a row of soundtrack area "B" and a row of soundtrack area "B" of film 20. By using only one lens system 80 to project radiation onto both spot sequences, the precise relative position of the area "B" and area "B" spot sequences can be maintained.

To accomplish this, the modulated laser radiation emerging from array 70b is directed by reflective elements 93 and 94 through lens 90, and the modulated laser radiation emerging from array 70c is directed by reflective element 92 through lens 91. As best shown in FIG. 7, the beam from lens 90 is incident on reflector 77 and the beam from lens 91 is incident on reflector 79. Reflectors 77 and 79 direct the beams incident thereon to reflective element 76, which in turn directs them to lens 75. After propagating through lens 75, the two beams are parallel and spaced much closer together than the corresponding beams from lenses 90 and 91.

The focused radiation emerging from lens 75 is incident on lens system 80, which spherically magnifies it down in size by a factor of 8.44. Lens system 80 protrudes upward through aperture 84b in flat table top 84. The radiation emerging from lens system 80 is projected upward onto a row of each of soundtrack areas "B" and "B" of motion picture film 20. Specifically, lens system 80 focuses the radiation to produce a real image waist on area "B" which measures 2.5 microns in the vertical direction and has a center-to-center bit spacing of 9 microns (horizontally), and a real image waist on area "C" which measures 2.5 microns in the vertical direction and has a center-to-center bit spacing of 9 microns (horizontally).

In the alternative embodiment of FIG. 8, shutter arrays 70b and 70c, reflectors 92, 93, 94, 76, 77, and 79, and lenses 75, 90, and 91, of FIG. 6 are replaced by shutter arrays 70b' and 70c', and reflector 76'. Modulated light from each of arrays 70b' and 70c' is reflected by reflector 76' onto first lens 80a of lens system 80. The light propagates from lens 80a through lens 80b of system 80, and is projected onto areas "B" and "B" of film 20. Thus, two parallel modulated beams are compressed by lenses 80a and 80b and focused on areas "B" and "B" as a real image measuring 2.5 microns vertically, with a center-to-center spacing of 9 microns.

In FIG. 8, mask 74 is mounted on a linear array of magneto-optic shutters 73 within each of arrays 70b' and 70c'. Mask 74 defines an aperture dimensioned to reduce the vertical size of the modulated beam to an amount which lenses 80a and 80b can further reduce to a 2.5 micron vertical image projection on film 20. Mask 74, and masking elements separating each pair of adjacent shutters 73, can be composed of germanium. The lengths, L and M, of the modulated beams propagating away from arrays 70b' and 70c' are 6.308 mm and 4.18 mm, respectively, in a typical embodiment of the FIG. 8 apparatus (corresponding to a center-to-center bit spacing of on the order of 76 microns). In this typical embodiment, the waist of the modulated beam propagating away from array 70b' is substantially equal to 76 microns (in the direction perpendicular to length L), and the waist of the modulated beams propagating away from array 70c' is substantially equal to 76 microns (in the direction perpendicular to length M).

The recording of digital audio bits in areas "B" "B" and "B" should be synchronized with the recording of a corresponding analog audio signal in the analog soundtrack area. In one embodiment, the digital recording means shown in FIG. 6 is mounted at a first location along the film transport path, and conventional means for recording the analog soundtrack are mounted at a second location along the film transport path. Preferably, the digital recording means is positioned twenty-two film (picture) frames ahead of the analog recording means (so that upon playback, the digital information will be read before the corresponding analog information).

"Negative" film 20 (which is typically black and white film stock) resulting from exposure to the above-described optical signals (which represent digital and analog audio information), must be processed in a printer to generate a theater-ready ("positive") print. A preferred embodiment of such a printer is shown in FIG. 9.

Figure 9:
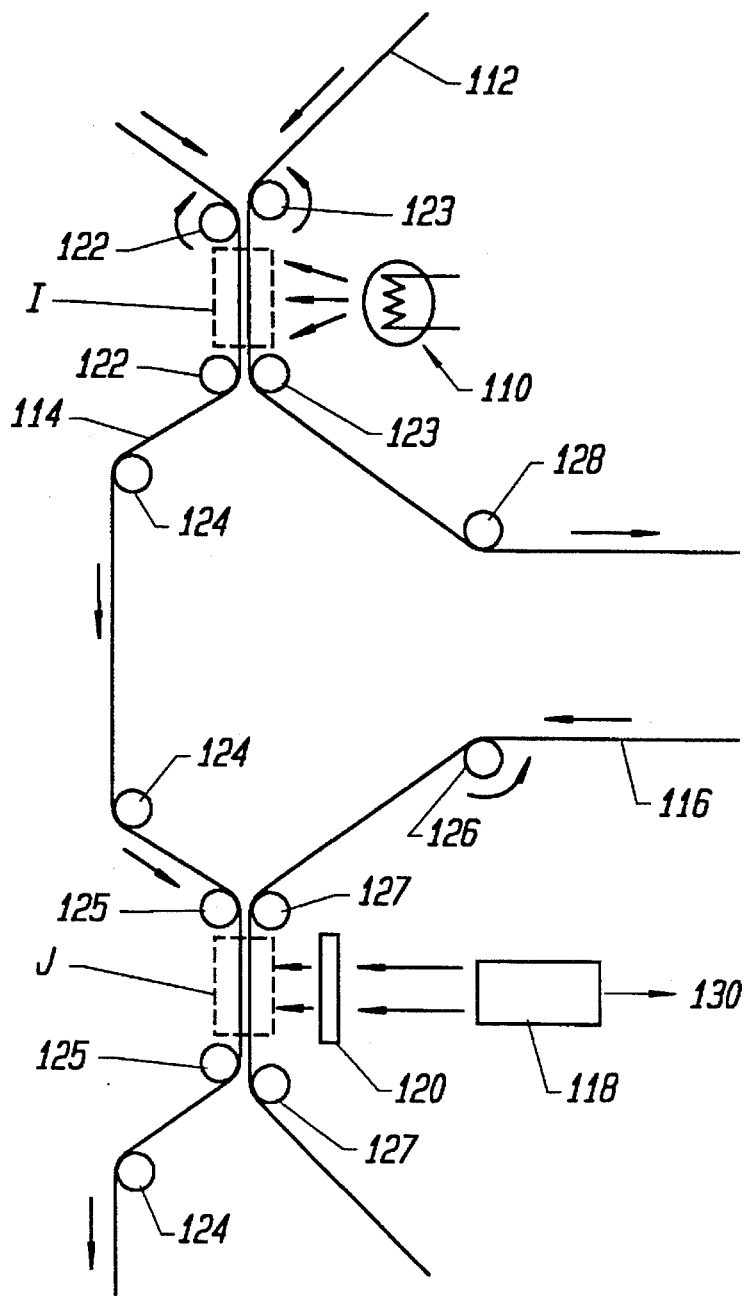
FIG. 9 is a schematic diagram of a preferred embodiment of a printing apparatus for printing film that has been exposed in accordance with the invention.

In FIG. 9, conventional "negative" color film 112 (which has negatives of the motion picture images recorded thereon) is translated by rollers 123 and 128 along the indicated path in the direction of the indicated arrows. Unexposed print film 114 is translated by rollers 122, 124, and 125 along the indicated path in the direction of the indicated arrows. At location I, rollers 122 and 123 urge a length of film 112 against a length of film 114. When incandescent lamp 110 illuminates film 112 and film 114 at location I, color images are printed on film 114.

"Negative" film 116 (which is typically black and white motion picture film) has negatives of the digital and audio soundtracks recorded thereon in accordance with the invention. Film 116 is translated by rollers 126 and 127 along the indicated path in the direction of the indicated arrows. At location J, rollers 125 urge a length of partially printed film 114 against a length of film 116. Laser 118 emits coherent radiation, which propagates through one or more apertures in rotatably mounted element 120 to illuminates film 116 and film 114 at location J, thereby printing the digital and audio soundtracks on film 114. Element 120 is shown in simplified side view in FIG. 9, so that the apertures through its face are not visible in FIG. 9.

The FIG. 9 apparatus can be a conventional printer (such as a Bell & Howell Type C film printer) that is modified in two respects. First, the conventional printer is modified to include the rotatable apertured element 120 of the invention (to be described in more detail below). Second, the conventional printer is modified to include a laser 118 that is capable of emitting a very wide beam for illuminating all three of digital soundtrack areas "A," "B," and "B" of film 116.

Figure 10:
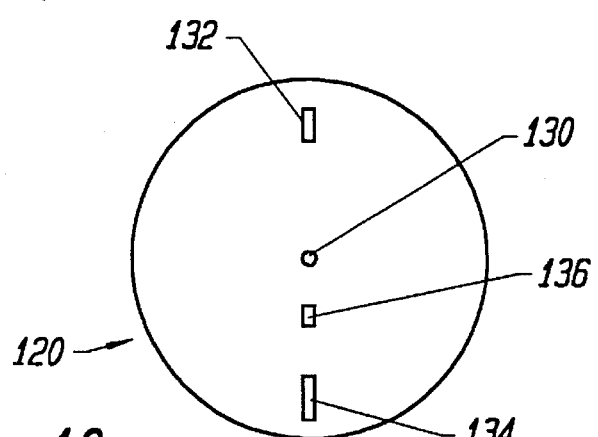
FIG. 10 is a front view of a rotatable apertured member employed in the FIG. 9 apparatus.

FIG. 10 is a front view of a preferred embodiment of element 120. Element 120 is rotatably mounted in the path of the beam from laser 118, so that it can be rotated about its fixed central axis 130 between a first position in which analog soundtrack aperture 132 is in the path of the laser beam, and a second position in which apertures 134 and 136 are in the path of the laser beam.

With element 120 in the first position, the beam of coherent radiation from laser 118 is projected through aperture 132 on an analog soundtrack area of film 116 (and on no other area of film 116). In this case, the apparatus of FIG. 9 prints only a conventional analog soundtrack on film 114.

If element 120 is in the second position, and if analog and digital audio soundtracks have been recorded on film 116 in the FIG. 2 format, the FIG. 9 apparatus prints not only an analog soundtrack, but also multiple digital soundtracks, on film 114. In this case, a portion of the laser radiation is projected through aperture 136 onto digital soundtrack area "B" of a film 116 at location J, and another portion of the laser radiation is projected through aperture 134 onto all three of the digital soundtrack area "B," the analog soundtrack area, and the digital soundtrack area "B" of film 116 at location J. Aperture 134 is wider than aperture 132, because the former must project radiation on wider region of film 116 than the latter.

Of course, numerous variations in the design of two-position apertured element 120 are possible. For example, the apertured element could have a semi-cylindrical shape, and could be rotatably mounted about its cylindrical axis, with the cylindrical axis perpendicular to axis 130 of FIG. 9. Alternatively, the apertured element could be translatably mounted, so that it can be translated between its first and second positions.

The estimated power consumption of the recording system (shown in FIG. 6) is 40 watts. The secondary voltages generated within the recording system need not have amplitudes in excess of 30 volts. Engineers of ordinary skill in the art will be capable of designing the printing apparatus (shown in FIG. 9) to be capable of accommodating a wide range of primary input voltages, as a matter of routine design.

The digital audio bits recorded in accordance with the invention typically will not represent a compressed version of an analog audio signal. Instead they typically represent an uncompressed version of an analog audio signal.

Various modifications and alterations in the described embodiments of the invention will be apparent to those skilled in the art without departing from the scope and spirit of this invention. Although the invention has been described in connection with specific preferred embodiments, it should be understood that the invention as claimed should not be unduly limited to such specific embodiments.

What is claimed is:

1. An apparatus for photographically recording digital audio bits in bit areas of a photosensitive medium, wherein each of the bit areas has a length U along a first axis, and a width V along a second axis substantially perpendicular to the first axis, including:

a means for continuously translating the medium in a direction parallel to the first axis in a plane at a rate R; and radiation projection means for projecting coherent radiation encoded with said digital audio bits for a duration T onto a row of spots on the plane, wherein the row of spots is oriented substantially parallel to the second axis, wherein each of the spots has a width V along the second axis and a length C along the first axis, wherein C is less than U, and wherein RT, the product of the duration T and the rate R, is substantially equal to the length U, wherein the radiation projection means includes:

laser means for generating a beam of the coherent radiation and directing the beam along a beam path; and a linear shutter array positioned in the beam path, for encoding the beam with at least some of said digital audio bits as said beam propagates therethrough, wherein the medium is a motion picture film, wherein the bit areas are located within three elongated soundtrack regions of the film, wherein the elongated soundtrack regions are oriented substantially parallel to the first axis, and wherein the row of spots extends substantially parallel to the second axis across all of the three elongated soundtrack regions, wherein the film defines a first column of sprocket holes and a second column of sprocket holes, wherein the film has a picture area between the first column of sprocket holes and the second column of sprocket holes, and wherein a first one of the elongated soundtrack regions extends substantially parallel to the first axis between the picture area and the first column of sprocket holes, a second one of the elongated soundtrack regions extends substantially parallel to the first axis between the picture area and the second column of sprocket holes, and a third one of the elongated soundtrack regions extends substantially parallel to the first axis between the second one of the elongated soundtrack regions and the second column of sprocket holes, wherein the laser means includes means for generating a second beam of coherent radiation and a third beam of coherent radiation, and wherein the linear shutter array generates from the beam a first encoded beam that is encoded with a first subset of the digital audio bits, as the beam propagates therethrough; and wherein the radiation projection means also includes:

a second linear shutter array for receiving the second beam, and generating from the second beam a second encoded beam that is encoded with a second subset of the digital audio bits as the second beam propagates therethrough;

a third linear shutter array for receiving the third beam, and generating from the third beam a third encoded beam that is encoded with a third subset of the digital audio bits as the third beam propagates therethrough;

a first lens means for receiving the first encoded beam and generating therefrom a first compressed beam, and projecting the first compressed beam on a row of spots coinciding with the first one of the elongated soundtrack regions; and a second lens means for receiving the second encoded beam and the third encoded beam and generating therefrom a second compressed beam and a third compressed beam, and projecting the second compressed beam on a row of spots coinciding with the second one of the elongated soundtrack regions, and projecting the third compressed beam on a row of spots coinciding with the third one of the elongated soundtrack regions.

2. The apparatus of claim 1, wherein the motion picture film is a black and white motion picture film, and wherein the first beam, the second beam, and the third beam have a wavelength in the green visible range.

* * * * *